United States Patent [19]

Matsuo et al.

[11] Patent Number: 4,858,104
[45] Date of Patent: Aug. 15, 1989

[54] PRECEDING INSTRUCTION ADDRESS BASED BRANCH PREDICTION IN A PIPELINED PROCESSOR

[75] Inventors: Masahito Matsuo; Toyohiko Yoshida, both of Itami, Japan

[73] Assignee: Mitsubishi Denki Kabushiki Kaisha, Tokyo, Japan

[21] Appl. No.: 143,547

[22] Filed: Jan. 13, 1988

[30] Foreign Application Priority Data

Jan. 16, 1987 [JP] Japan .................................. 62-8394

[51] Int. Cl.⁴ ................................................ G06F 9/38
[52] U.S. Cl. .................................................... 364/200
[58] Field of Search ... 364/200 MS File, 900 MS File

[56] References Cited

U.S. PATENT DOCUMENTS 4,176,394 11/1979 Kaminski et al. .................... 364/200
4,200,927 4/1980 Hughes et al. ....................... 364/200
4,370,711 1/1983 Smith ................................... 364/200
4,471,433 9/1984 Matsumoto .......................... 364/200
4,477,872 10/1984 Losq et al. .
4,764,861 8/1988 Shibuya ............................... 364/200

OTHER PUBLICATIONS

*IEEE Computer,* vol. 17, No. 1, Jan. '84.

*Primary Examiner*—Emanuel S. Kemeny
*Assistant Examiner*—Christopher H. Lynt
*Attorney, Agent, or Firm*—Townsend and Townsend

[57] ABSTRACT

A branch prediction for predicting, prior to executing a given branch instruction, whether the branch condition of the given branch instruction will be established, utilizes an address of an instruction that precedes the given branch instruction to access the branch prediction information for the given branch instruction from a branch prediction table.

6 Claims, 5 Drawing Sheets

| BRANCH INSTRUCTION ADDRESS | BRANCH PREDICTION BIT |
|---|---|
| 0 0 0 0 0 0 0 | 0 |
| 0 0 0 0 0 0 1 | 1 |
| 0 0 0 0 0 1 0 | 1 |
| ⋮ | ⋮ |
| 1 1 1 1 1 1 0 | 0 |
| 1 1 1 1 1 1 1 | 1 |

| ADDRESS OF INSTRUCTION WHICH IS EXECUTED JUST BEFOR BRANCH ADDRESS | BRANCH PREDICTION BIT |
|---|---|
| 0 0 0 0 0 0 0 | 0 |
| 0 0 0 0 0 0 1 | 1 |
| 0 0 0 0 0 1 0 | 1 |
| ⋮ | ⋮ |
| 1 1 1 1 1 1 0 | 0 |
| 1 1 1 1 1 1 1 | 1 |

PRECEDING INSTRUCTION ADDRESS BASED BRANCH PREDICTION IN A PIPELINED PROCESSOR

BACKGROUND OF THE INVENTION

1. Field of the Invention

The present invention relates to a data processor, such as a microprocessor, and more particularly to a data processor being provided with a pipeline system including a branch prediction system.

2. Description of the Prior Art

A data processor, such as a microprocessor, often utilizes a pipeline system for processing instructions or data at high speed.

The pipelining of, for example, instruction processing, executes, in parallel, a series of processes including fetch, decode, and execute operations. The time required for processing one instruction in the pipeline system is about the same as in a non-pipelined system, but the entire throughput is improved to enable to processing at high speed.

In instruction pipelining, when the target of a branch instruction is required, the prefetched instructions following the branch instruction are cancelled and the branch target instruction at the destination address of the branch instruction is newly fetched. In this case, the throughput of the pipeline is decreased. A branch prediction table is used to reduce the effects of branch instructions on pipeline throughput.

FIG. 1 is a block diagram of a conventional pipeline including a branch prediction unit. In FIG. 1, an instruction prefetch queue 1 prefetches an instruction from a data bus 6 connected to a main memory, or an instruction memory, (not shown), thereby forming an instruction queue.

The prefetched instruction is transferred to an instruction decoder 2 that reads the instruction prefetched by the instruction prefetch queue 1 from the instruction memory and decodes the instruction. The instruction decoder transfers the address S2 of the next instruction to be decoded to a branch prediction unit 4.

Next, the instruction is transferred to an instruction execution unit 3 that executes the contents of instruction decoded by the instruction decoder 2.

A branch prediction unit 4, predicts the occurrence of a branch condition in accordance with the stored contents of a branch prediction table as described below.

A destination address generation circuit 5, generates a destination address when a branch instruction is decoded at the instruction decoder 2 and transfers it to the instruction prefetch queue 1.

The date bus 6 is connected to the main memory (not shown), instruction prefetch queue 1, and instruction execution unit 3.

This conventional data processor operates as follows:

The instruction decoder 2, while the instruction execution unit 3 is executing a first instruction, decodes a second instruction to be executed next. Accordingly, at the point of time when the instruction execution unit 3 completes execution of the first instruction, the instruction decoder 2 has already completed decoding of the second instruction. Thus, the instruction execution unit 3 can immediately execute the second instruction.

The instruction prefetch queue 1 utilizes the time when the memory (not shown) is not being accessed and prefetches the following instructions, thereby reducing the time required to fetch the following instruction.

Thus, during pipeline processing, the instruction prefetch queue 1, instruction decoder 2 and instruction execution unit 3 operates in parallel to improve the rate of throughput of the processor.

However, if a branch instruction is executed by the instruction execution unit 3 and the branch condition is established, then the target instruction at the destination address will be executed next. In this case, the instruction prefetched in the prefetch queue 1 and the decoding result of the instruction decoder 2 are canceled. At this point in time, the destination address generation circuit 5 generates the destination address of the target instruction and transfers it to the instruction prefetch queue 1. Next, the instruction prefetch queue 1 fetches the target instruction at the destination address through the data bus 6 and forms a new instruction queue.

Because the target instruction must be fetched from main memory and decoded prior to execution, a delay is introduced each time the branch condition of a branch instruction is established.

The branch prediction unit 4 reduces the delays caused by branch instructions. The unit is utilized to predict, at the decode stage, whether the branch condition of the branch instruction being decoded will be established. The branch prediction unit includes therein a branch prediction table as shown in FIG. 2 which stores a set of branch instruction addresses and associated branch prediction bits. For a given branch instruction address, if the branch prediction bit is "1" then the branch condition was established the last time the branch instruction was executed. If the branch prediction bit is "0" then the branch condition was not established.

When the address of the instruction to be decoded next by the instruction decoder 2 is transferred, as an address signal S2, to the branch prediction unit 4, the branch prediction unit 4 reads out the branch prediction bit, corresponding to the transferred address, from the branch prediction table and transfers it to the instruction decoder.

Meanwhile, upon transferring the next instruction from the instruction prefetch queue 1 to the instruction decoder 2, the instruction decoder 2 starts decoding the next instruction. As a result, when the decoded instruction is a branch instruction and the branch prediction signal S1 given from the branch prediction unit 4 predicts the occurrence of branch, the instruction fetched at that time by the instruction prefetch queue 1 is canceled. Further, the destination address generation circuit 5 generates the destination address on the basis of the decoding result as the instruction decoder and transfers it to the instruction prefetch queue 1. Hence, the instruction prefetch queue 1 fetches the branch target instruction from the main memory and gives it to the instruction decoder 2.

Accordingly, if no branch prediction unit 4 is provided, both the decoding and fetch operations previously carried out by the instruction decoder 2 and instruction prefetch queue 1 are cancelled when a branch instruction is executed. However, if the branch prediction unit 4 is provided, only the decoding operations 2 is cancelled.

If the branch prediction comes true, then the instruction to be executed next by the instruction execution unit 3 is early fetched from the main memory, and pipeline latency until the next instruction execution is reduced. Thereafter, new registration or updating of the branch prediction table is carried out.

On the contrary, when the branch prediction fails, the instruction address now under execution by the instruction execution unit 3 is given as an address signal S3 to the branch prediction unit 4, thereby carrying out the new registration updating the branch prediction table shown in FIG. 2.

In addition, the update of the branch prediction table is carried out in such a manner that, when the branch actually occurs in spite of non-prediction of branch occurrence, the branch prediction bit corresponding to the address of branch instruction is rewritten to a logical "1". If the branch instruction actually does not branch, in spite of prediction of the branch occurrence, the branch prediction bit corresponding to that address of branch instruction is rewritten to a logical "0". Also, when a branch instruction not registered in the branch prediction table is newly executed its address and branch prediction bit are registered in the branch prediction table.

The above operation of the branch prediction unit 4 restrains disturbance in the pipeline flow and improves the throughput of the apparatus.

The data processor being provided with the pipeline system carrying out the above-described branch prediction, predicts the branch occurrence in accordance with the branch predicting signal S1 given from the branch prediction unit 4 when the branch instruction is decoded at the instruction decoder 2. Hence, it is required to give to transfer the branch prediction signal to the instruction decoder prior to decoding the branch instruction at the instruction decoder 2.

However, prior to fetching the branch prediction bit from the branch prediction unit 4 the address of the next instruction must be calculated at the decode stage. For processors having variable length instructions, this calculation may not be started until the decoding of the current instruction is completed. Once the address of the next instruction is calculated the branch prediction bit for the next instruction may be fetched from the branch prediction unit 4. FIG. 3 is a timing diagram illustrating the operation of the conventional circuit.

Referring to FIG. 3, as described above, a given instruction cannot be decoded unless the branch prediction bit BPB, for that instruction has been provided to the decode stage. Accordingly, from the figure, the BPB(1) is provided to the decoder and I1 is decoded starting at T1. The time interval required to complete decoding I1 is $t_D$. Upon completion of the decode operation, the address, A2, of the next instruction is calculated. The time interval required to complete this address computation is $t_A$. Next, A2 is utilized to fetch the branch prediction bit, BPB(2), for the next instruction, I2. The time interval required to complete the fetch of BPB(2) is $t_F$. Now that BPB(2) has been provided to the decode stage, the next instruction, I2, may be transferred from the prefetch stage to and the decode stage. Thus, the minimum time interval between the transfer of sequential instructions, e.g. I1 and I2, from the prefetch stage to the decode stage is the sum of $t_D$, $t_A$, and $t_F$.

From the above, it is apparent that the necessity of sequentially calculating the next address and fetching the next BPB during the decode operation extends the time required to complete the decode function and slows down the rate of throughput of the pipeline.

In FIG. 4, reference numeral 1 designates an instruction prefetch queue, which prefetches an instruction from a data bus 6 connected to a main memory or instruction memory (not shown), thereby forming a queue.

Reference numeral 2 designates an instruction decoder, which reads out the instruction prefetched by the instruction prefetch queue 1 from the instruction memory and decodes it, the instruction decoder 2 giving to a branch prediction unit 4 address of the instruction now under decoding as an address signal S4.

Reference numeral 3 designates an instruction execution unit, which executes the contents of the instruction decoded by the instruction decoder 2. The instruction execution unit 3 gives the address of the instruction previously executed just before the instruction under execution now as an address signal S5 to the branch prediction unit 4 for registration.

SUMMARY OF THE INVENTION

The present invention is a branch prediction system for use with an instruction pipeline that eliminates the increased processing time at the decode stage due to the sequential decode, address calculation, and branch prediction bit fetch operations executed in the conventional system described above.

In a preferred embodiment of the system, a series of instructions, including branch instructions are processed by the pipeline. The branch prediction information of a given branch instruction is accessed from a branch prediction table by the address of an instruction that precedes the branch instruction in the sequence of instruction. Thus, the branch prediction information is provided to the decode stage during the processing of the preceding instruction and the operations of decoding and fetching branch prediction information are performed concurrently instead of occurring in series.

According to one aspect of the invention, the branch prediction information is accessed by the address of the instruction immediately preceding the given branch instruction.

According to a further aspect of the invention, the branch prediction information is updated when the given branch instruction is executed. The address of the instruction executed immediately before the branch instruction is also provided.

According to a still further aspect of the invention, the accessed branch prediction information is utilized to prefetch the target instruction of the branch instruction prior to executing the branch instruction.

Other advantages and features of the invention will become apparent in view of the drawings and following detailed description.

DETAILED DESCRIPTION OF THE PREFERRED EMBODIMENTS

Next, an embodiment of a data processor of the invention will be described with reference to the drawings.

Figures 1, 2:
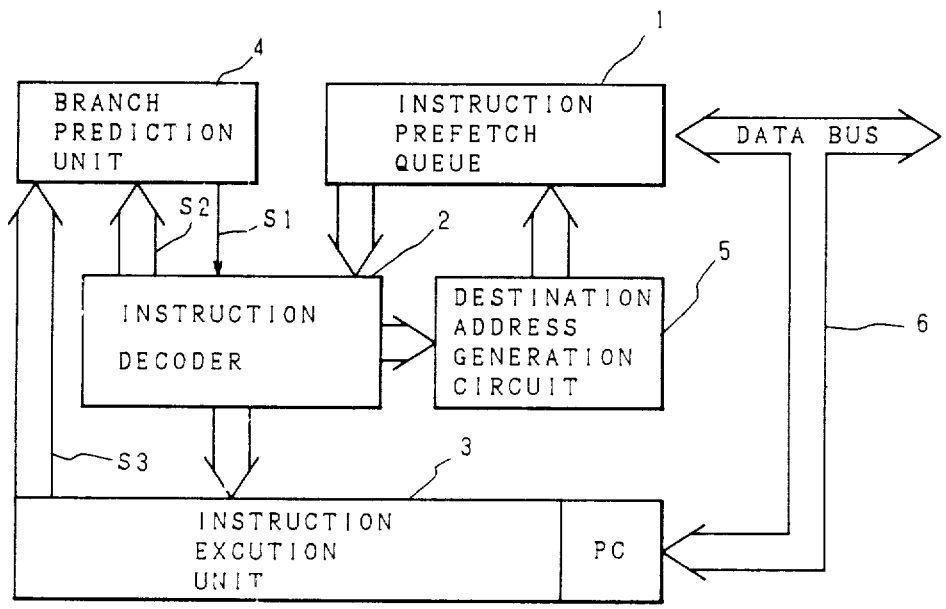
FIG. 1 is a block diagram of the principal portion of the conventional data processor having a pipeline system.
FIG. 2 is a typical view exemplary of the contents of a branch prediction table.
Figures 4, 5:
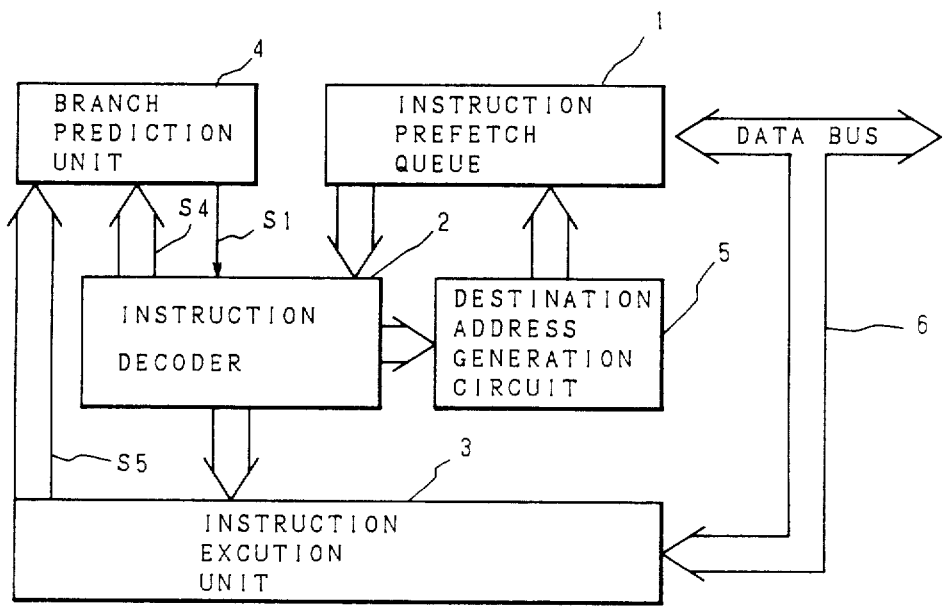
FIG. 4 is a block diagram of the principal portion of an embodiment of a data processor of the invention having the pipeline system.
FIG. 5 is a typical view exemplary of the contents of the branch prediction table of the embodiment shown in FIG. 4.

FIG. 4 is a block diagram of the principal portion of an embodiment of the data processor of the invention having a pipeline system. In addition, the components being the same or corresponding to those shown in FIG. 1 are designated with the same reference numerals.

The instruction prefetch queue 1, instruction decoder 2, instruction execution unit 3, branch prediction unit 4, destination address generation circuit 5, and data bus 6 perform substantially the same functions described above with reference to FIG. 1.

The difference between the two systems are as follows. First, the address signal S4, transferred from the decode stage 2 to the branch prediction unit 4, is the address of the instruction currently being processed in the decode stage 2. Secondly, the address signal S5, transferred from the instruction execution unit 3 to the branch prediction unit 4, includes the address of the instruction immediately preceding the instruction currently being processed in the instruction execution unit 3. Finally, the branch prediction unit 4 is differently configured as illustrated in FIG. 5.

Referring now to FIG. 5, the branch prediction bit for a given branch instruction is associated with the address of the instruction immediately preceding the given branch instruction. As above, the value of the branch prediction bit is determined by whether the branch condition was established at the immediately preceding time that the given branch instruction was executed. The configuration of FIG. 5 enables the decode stage 2 to prefetch the branch prediction bit for the next instruction to be decoded prior to the transfer of the next instruction from the prefetch queue 1 to the decode stage 2. As described more fully below, this prefetch reduces the time required to process an instruction at the decode stage 2 and increases the rate of throughput of the pipeline.

Figure 6:
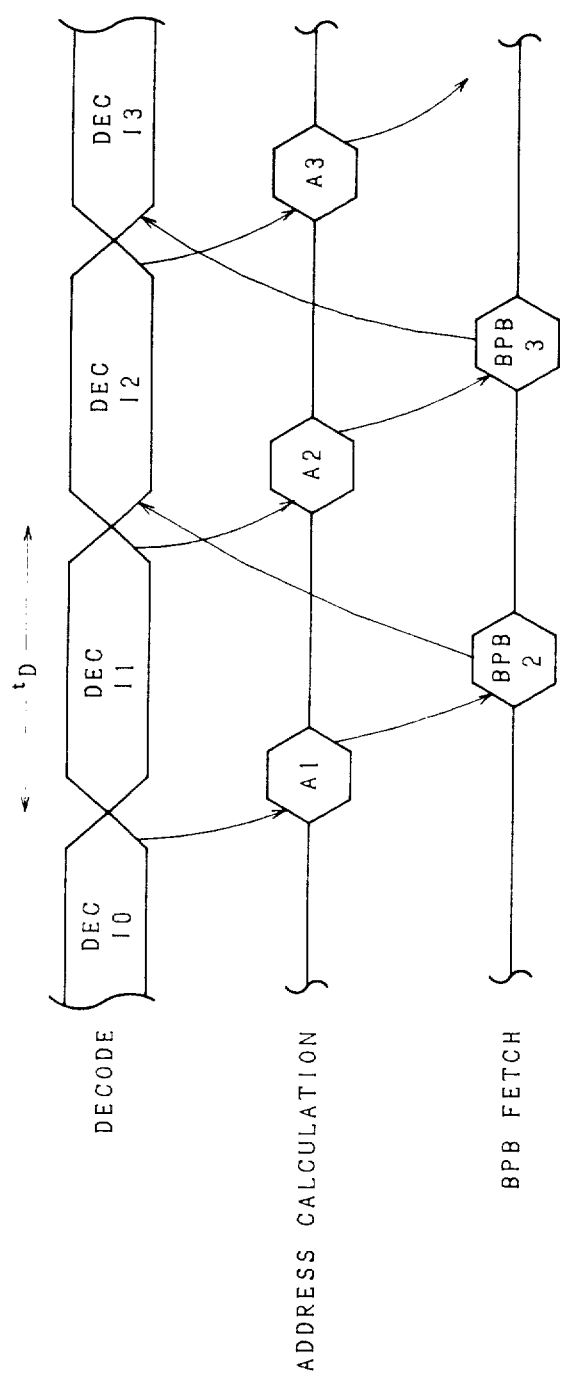
FIG. 6 is a timing chart explaining the operation of the embodiment of the data processor of the invention.

The effect of the invention on the rate of throughput of the pipeline is illustrated in FIG. 6. Referring to FIG. 6, the decoding of the first instruction, I1, and the calculation of the address, A1, begin simultaneously. Note that the calculation of A1 requires that decoding of the preceding instruction, I0, be completed. The address A1 is utilized to fetch the branch prediction bit, BPB(2), of the second instruction, I2. At this time, the next instruction, I2, may be decoded because BPB(2) has been provided to the decode stage.

Figure 3:
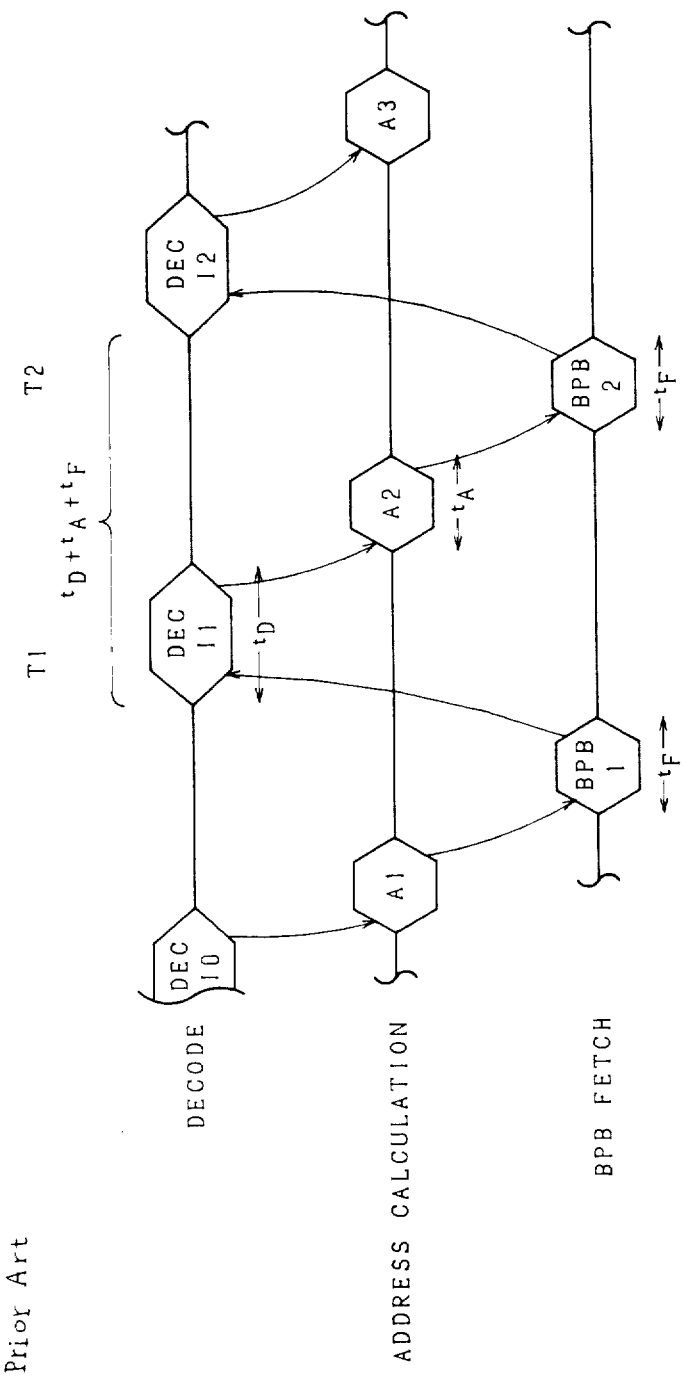
FIG. 3 is a timing chart explaining the operation of the conventional data processor.

In contrast to the operation of the conventional circuit, described with reference to FIG. 3, the time between transfers from the prefetch stage to the decode stage is not determined by the sum of the time intervals for decoding, address computation, and BPB fetch. Instead, the calculation of instruction address, A1, and the fetch of the branch prediction bit, BPB(2), for the next instruction, I1, are done concurrently with the decoding of the instruction I1. Thus, the time interval between transfers is determined only by the time interval required to decode the instruction and the rate of throughput of the pipeline is increased.

The updating of the branch prediction table of FIG. 5 will now be described. If the prediction encoded in the branch prediction bit for a given branch instruction is in error then the branch prediction bit is updated by being set to logical "1" if the branch condition actually was established and by being set to logical "0" if the branch condition actually was not established. If the address of the instruction immediately preceding a given branch instruction is not in the branch prediction table, then a branch prediction bit cannot be referred from the table. In this case, a predetermined signal is transferred from the branch prediction unit 4 to the decode stage 2 and processing of the given branch instruction proceeds without the branch prediction bit. When the given branch instruction is executed in the instruction execution unit 3, the address of the instruction immediately preceding the given branch instruction and the branch prediction bit, indicating whether the branch condition for the given branch instruction was established, are transferred, via signal S5, and registered in the branch prediction table.

In the branch prediction table of FIG. 4, branch prediction bits are referred by addresses of instructions immediately preceding branch instructions that have been executed. Accordingly, as described above, no branch prediction bit can be referred from the table for a branch instruction that has not been executed.

Figure 7:
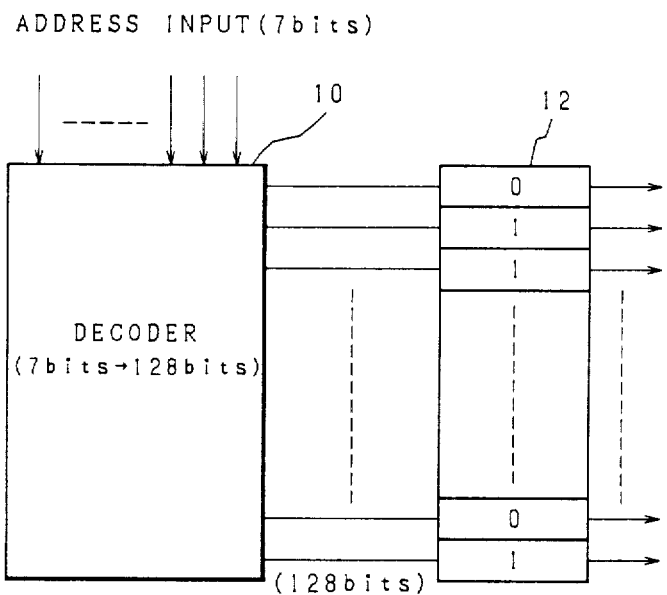
FIG. 7 depicts an alternate embodiment of the branch prediction unit.

FIG. 7 depicts an alternate embodiment of a branch prediction table that refers a branch prediction bit for every instruction address, with the branch prediction bit being a logical "0" for addresses of instructions preceding non-branch instructions.

In FIG. 7, a 7 to 128 pl bit decoder 70 has its inputs coupled to receive a 7 bit field of the address being decoded and has its 128 output lines coupled to refer a branch prediction bit from a branch prediction bit storage unit 72.

In operation, all branch prediction bits in the branch prediction bit storage unit 72 are initialized to "0". Then, the branch prediction bit for each instruction is referred by decoding the 7 bit address field of the immediately preceding instruction. When a branch instruction is executed, the branch prediction bit referred by the address of the instruction immediately preceding the branch instruction is registered or updated if the branch prediction fails.

The advantages of the branch prediction unit described above are now apparent. By configuring the branch prediction table as illustrated in FIGS. 5 or 7 and providing the address of the instruction currently being processed in the decode stage 2 to the branch prediction table, it is possible to prefetch the branch prediction bit for the next instruction while the present instruction is being decoded. Thus the delays associated with address computation and branch prediction bit fetch are not summed to determine the processing interval at the decode stage and the magnitude of this processing interval is decreased.

Alternatives and substitutions to the embodiments described above will now be apparent to persons of skill in the art. For example, the address of the instruction immediately preceding the given branch instruction need not be used to access the branch prediction bit. Instead, the address of an instruction that precedes the given branch instruction by an arbitrary number of places in the sequence of instructions could be utilized.

Of course the system would have to be modified to accommodate this alternative. Accordingly, it is not intended to limit the scope of the invention except as provided by the appended claims.

What is claimed is:

1. In a data processor of the type having a pipeline system for executing pipeline processing on a sequence of instructions, including branch instructions, corresponding to associated instruction addresses and having a prefetch unit for preliminary fetching instructions corresponding to instruction addresses provided thereto, an instruction decoder that receives an instruction from said prefetch unit and that decodes the received instruction, and an instruction execution unit that receives the decoded instruction from said instruction decoder and executes said instruction, a branch prediction system comprising:

a branch prediction unit, having a branch prediction table with branch prediction information stored therein for predicting whether the branch condition of a given branch instruction will be established;

means for accessing the branch prediction information for said given branch instruction, prior to decoding the given branch instruction, with the instruction address of a selected instruction that precedes the given branch instruction in the sequence of instructions.

2. The invention of claim 1 further comprising:

means for updating the branch prediction table information when said given branch instruction is executed.

3. The invention of claim 2 further comprising:

means for generating the destination address for the given branch instruction if the accessed branch prediction information predicts that the branch condition of the given branch instruction will be established.

4. In a data processor of the type having a pipeline system for executing pipeline processing on a sequence of instructions, including branch instructions, corresponding to associated instruction addresses and having a prefetch unit for preliminary fetching instructions corresponding to instruction addresses provided thereto, an instruction decoder that receives an instruction from said prefetch unit and that decodes the received instruction, and an instruction execution unit that receives the decoded instruction from said instruction decoder and executes said instruction, a branch prediction system comprising:

a branch prediction unit, having a branch prediction table with branch prediction information stored therein for predicting whether the branch condition of a given branch instruction will be established;

means for accessing the branch prediction information for said given branch instruction, prior to decoding the given branch instruction, with the instruction address of a selected instruction that precedes the given branch instruction in the sequence of instructions; and means for updating the branch prediction table information when said given branch instructions is executed.

5. In a data processor of the type having a pipeline system for executing pipeline processing on a sequence of instructions, including branch instructions, corresponding to associated instruction addresses and having a prefetch unit for preliminary fetching instructions corresponding to instruction addresses provided thereto, an instruction decoder that receives an instruction from said prefetch unit and that decodes the received instruction, and an instruction execution unit that receives the decoded instruction from said instruction decoder and executes said instruction, a branch prediction system comprising:

a branch prediction unit, having a branch prediction table with branch prediction information stored therein for predicting whether the branch condition of a given branch instruction will be established;

means for accessing the branch prediction information for said given branch instruction, prior to decoding the given branch instruction, with the instruction address of a selected instruction that precedes the given branch instruction in the sequence of instructions; and means for generating the destination address for the given branch instruction if the accessed branch prediction information predicts that the branch condition of the given branch instruction will be established.

6. In a data processor of the type having a pipeline system for executing pipeline processing on a sequence of instructions, including branch instructions, corresponding to associated instruction addresses and having a prefetch unit for preliminary fetching instructions corresponding to instruction addresses provided thereto, an instruction decoder that receives an instruction from said prefetch unit and that decodes the received instruction, and an instruction execution unit that receives the decoded instruction from said instruction decoder and executes said instruction, a branch prediction system comprising:

a branch prediction unit, having a branch prediction table with branch prediction information stored therein for predicting whether the branch condition of a given branch instruction will be established;

means, at the instruction decoder, for calculating the address of a selected instruction currently being decoded;

means for utilizing said calculated address to access the branch prediction table information for said given branch instruction, where said given branch instruction follows said selected instruction in the sequence of instructions.

* * * * *